United States Patent [19]

Flor

[11] 4,035,074
[45] July 12, 1977

[54] STEP AND REPEAT CAMERA HAVING AN IMPROVED FILM PROCESSOR

[75] Inventor: Lawrence A. Flor, Anoka, Minn.

[73] Assignee: Minnesota Mining and Manufacturing Company, St. Paul, Minn.

[21] Appl. No.: 640,871

[22] Filed: Dec. 15, 1975

[51] Int. Cl.² .................. G03B 27/32; H05B 3/44; G03B 27/42; G03B 27/52
[52] U.S. Cl. .................. 355/27; 219/469; 355/39; 355/53; 355/64
[58] Field of Search ........... 432/60; 219/469, 471; 355/28, 29, 39, 54, 27, 77, 64, 53, 73, 65, 66

[56] References Cited

U.S. PATENT DOCUMENTS

| | | | |
|---|---|---|---|
| 2,645,153 | 7/1953 | Halpern | 355/73 |
| 3,136,232 | 6/1964 | Shoberg et al. | 355/39 X |
| 3,261,259 | 7/1966 | Baptie et al. | 355/39 |
| 3,398,638 | 8/1968 | Frohlich | 355/73 X |
| 3,439,905 | 4/1969 | Alseth | 432/60 |
| 3,469,077 | 9/1969 | Peterson et al. | 219/469 |
| 3,528,355 | 9/1970 | Blackert | 355/27 X |
| 3,558,223 | 1/1971 | Hemphill | 355/64 X |
| 3,680,461 | 8/1972 | Amesbury et al. | 355/54 X |
| 3,746,444 | 7/1973 | Kahle et al. | 355/54 X |
| 3,782,820 | 1/1974 | Kohn et al. | 355/27 X |
| 3,965,332 | 6/1976 | Thettu | 219/469 X |

FOREIGN PATENT DOCUMENTS 285,960   5/1931   Italy .................. 355/28

Primary Examiner—Donald A. Griffin
Attorney, Agent, or Firm—Cruzan Alexander; Donald M. Sell; John C. Barnes

[57] ABSTRACT

A step and repeat camera is disclosed which includes a module for supporting a supply of film material, for metering a length of film material from the support and cutting the film to a predetermined length, a second module for supporting the cut sheet of film with the light sensitive coated surface positioned downward and moving the film along X and Y coordinates to position successive areas of the film over an image projecting lens. The support moves the film from a first film receiving conveyor to a titling area where a title is contact exposed onto the film, through the imaging section along the coordinates, and to the discharge conveyor. The third module includes apparatus for conveying the film over a DC corona bar which causes the film to adhere to a hot processing drum and to be carried thereby under a heated shoe past an AC corona bar to discharge the film, permitting the same to drop from the surface of the drum across its initial infeed path into a cooling chute.

3 Claims, 5 Drawing Figures

WORK REPORT - SUMMER 1975 - JOHN DOE

STEP AND REPEAT CAMERA HAVING AN IMPROVED FILM PROCESSOR

BACKGROUND OF THE INVENTION

1. Field of the Invention

This invention relates to an improved step and repeat camera for photographing documents onto a microfiche. In one aspect this invention relates to an improved processor for use in a step and repeat camera affording the rapid heat processing of exposed microfiche-sized sheets. Another aspect of the present invention is the positioning of a cut sheet of film for exposing the same to a transparency to impart a latent image of a title onto the sheet and the transporting of the sheet along XY coordinates to impart successive latent images thereto.

2. Description of the Prior Art

The present invention deals with a camera construction for imparting sequentially images onto a light-sensitive sheet of film to impart thereto, upon development, images of documents along XY coordinates of the sheet of film, developing the film and then discharging the finished microfiche with a title imparted to the microfiche and the series of visible images.

Prior art cameras exist for imparting successive images to wide portions of film and to sheets of film and then discharging the film for processing.

Examples of these cameras are shown in U.S. Pat. No. 3,674,367, issued July 4, 1972, to B. M. Chapman; U.S. Pat. No. 3,697,176, issued Oct. 10, 1972 to M. R. Kuehnle et al; and U.S. Pat. No. 3,680,461, issued Aug. 1, 1972 to M. G. Amesbury et al.

The patent to B. M. Chapman discloses a method for handling and positioning film within a camera wherein the film is fed from a supply and severed by a rotary knife, a vacuum platen seizes the length of the film before it is severed and then carries it along mutually perpendicular XY axes to precisely position sections of the film for exposure by a cathode ray tube. After the desired images are applied to the sheet of film the vacuum platen moves directly beneath a film export device 22, and a pair of pinch rollers close upon the film edge to withdraw the film from the camera for storage or further processing. This camera construction is similar to that of applicant's except that applicant's device is provided with a device for contact exposing a title to the film and a transport to transport the sheet of film directly into a heat processor for processing sheet film. Processors within the camera are also known in the art as illustrated in the patent to Kuehnle et al, wherein the exposed image on the film section is processed by a liquid electrostatic toner which develops the image on the film, and which toner image is fused by a heater which engages the surface of the microfiche. Thus, the type of processor which is utilized in the camera can vary according to the type of film utilized and preferably a camera wherein processing is accomplished by a predetermined temperature over a predetermined time period affords a simpler camera than one utilizing xerographic reproduction of the latent image.

The patent to Amesbury et al discloses a drive means for indexing a film along X and Y axis, affording the positioning of the same over the lens. This patent is believed to provide a teaching of moving the platen along coordinates with sufficient precision to permit the repeated exposure of images onto different sections of the film.

Processors for sheets having a coating which is heat developed have taken various forms. One such form is disclosed in U.S. Pat. No. 3,469,077, issued Sept. 23, 1969 to K. H. Petersen et al. This patent discloses a heating device for the development of copy sheets and utilizes a heated drum or a heated shoe about the drum for imparting heat to a copy sheet to afford development of a latent image. This structure however permits the copy sheet to directly contact the drum or the belt which transports it about the drum or to directly contact the heated shoe which is not permitted when developing a fragile photo-sensitive heat-developable coating on one surface of the sheet. This type of coating requires that the coated surface be maintained in a spaced relationship from any other surface during the times the sheet material is being heated to restrict the possibility of removal or displacement of the image-forming coating while the same is heated. Another such developer for film material having the fragile photosensitive heat-developable coating is U.S. Pat. No. 3,439,905, issued Apr. 22, 1969 to G. N. Alseth. In this device the sheet material was held against the surface of a heated drum by means of tiny apertures in the surface of the drum which would pull the uncoated surface of the sheet material into intimate contact with the drum. Thus, the heat from the drum could penetrate through the backing to heat the coating and bring the same to a temperature for a period of time sufficient to develop the image thereon. This type of developing apparatus requires relatively high precision in the heating of the drum to permit the sheet material to be brought up to uniform temperature and maintained for the predetermined period of time sufficient to afford its development.

SUMMARY OF THE INVENTION

The present invention overcomes the difficulties of the prior art devices and affords many advantages over the prior art devices in that the camera structure cuts lengths of light-sensitive film material and positions the same on a vacuum platen for movement to an image area where the film is exposed to receive a latent image of a title in a prescribed area of the cut film. The platen is later moved along XY coordinates to position precisely successive image-receiving areas at the focal plane of a lens to impart latent images thereto of documents on a copyboard.

The film is then placed into a processor. The processor comprises a conveyor for receiving an exposed sheet of film, emulsion side down, and moving the film along a predetermined path, a heated drum at ground potential rotatably mounted about an axis transverse to the direction of movement of said conveyor and supporting the periphery of said drum generally tangential to the direction of movement of said conveyor, and a heating shoe disposed in spaced relationship about the periphery of said drum. The drum affords conductive heating of the film and the shoe affords convective heating of the film sufficiently to afford the rapid uniform development thereof. A d.c. corona charging means disposed adjacent the end of said conveyor and the surface of said drum places a charge on the film moved by the conveyor into contact with said drum and a discharging a.c. corona located above the conveyor and adjacent the drum surface near the discharge end of the shoe removes the charge from the film after the same has passed about the surface of said drum to permit the film to fall edgewise from the surface of the heated drum. A cooling chute receives the falling film and since the film is moving edgewise it is planar and when cooled, will lie flat and not curled.

The platen comprises a plate positioned beneath a manifold connected to a blower for reducing the pressure within said manifold beneath atmospheric pressure. The plate is preferably a sintered plate having a smooth surface forming the optical support for the sheet of film. The character of the plate restricts reflection and background appearing on the processed film.

The shoe is heated to about 300° F (149° C), and the drum to about 265° F (130° C) with the surface of the shoe disposed about one-eight inch (3mm) from the drum surface for uniformly heating a sheet of film having the light sensitive heat-developable coating such as disclosed in U.S. Pat. No. 3,457,075, issued to D. A. Morgan et al, on July 22, 1969.

BRIEF DESCRIPTION OF THE ACCOMPANYING DRAWING

The present invention will be more fully understood upon reading the following description which refers to the accompanying drawing wherein.

DETAILED DESCRIPTION OF THE PREFERRED EMBODIMENT

Figures 1, 2:
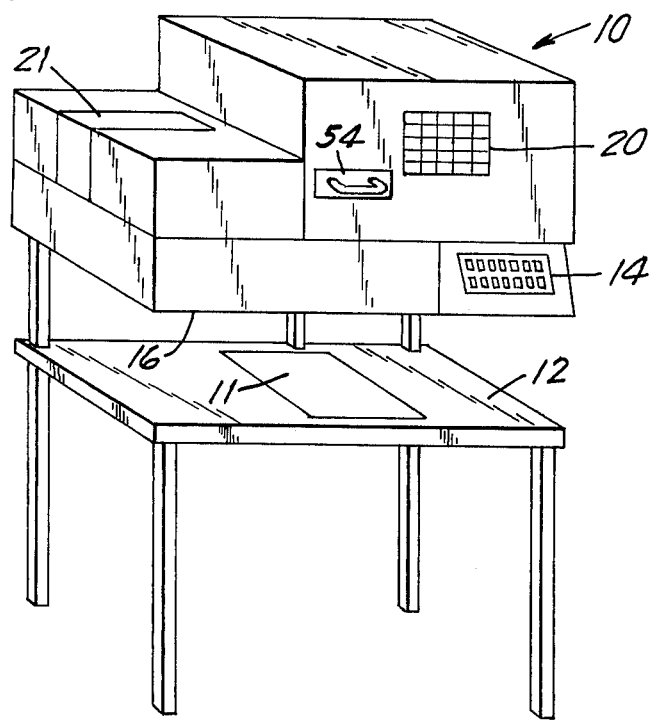
FIG. 1 is a perspective view of a document to microfiche camera constructed according to the present invention.
FIG. 2 is an elevational view of a microfiche as produced by the camera of FIG. 1.

FIG. 1 illustrates the exterior of a step and repeat microfiche camera 10 constructed in accordance with the present invention. In operation, a document 11 to be filmed is positioned on a copy plane 12 and upon operation of the controls on a panel 14 suitable lights in the form of lamps behind a panel 16 illuminate the copy plane 12 and document 11. Through suitable mirrors positioned above the copy plane 12 a light image of the document 11 is projected through an objective lens and shutter structure to expose an area of a sheet of light-sensitive heat-developable film material positioned in registry with the objective lens to impart a latent image to the film material in an area as indicated on a display screen 20 on the front face of the camera 10. Upon exposure of that area of the film to the document 11 the film is moved along an X and/or a Y coordinate to position another section of the film in registry with the objective lens to impart an image of another document 11 onto the film. When it is desired to process the exposed film the suitable button on the control panel 14 is pushed and within a predetermined interval the processed microfiche is discharged from the camera 10. An access opening 21 permits an unexposed roll of film material 22 to be placed in the camera 10.

FIG. 2 illustrates a developed microfiche 25 having a title in a title area 26 and images 27 in X Y coordinates positioned over the remaining area of the sheet of film. The microfiche 25 illustrates the product produced by the camera of the subject invention wherein substantially all of the image areas on the film section have an image imparted and visible thereon.

Figure 3:
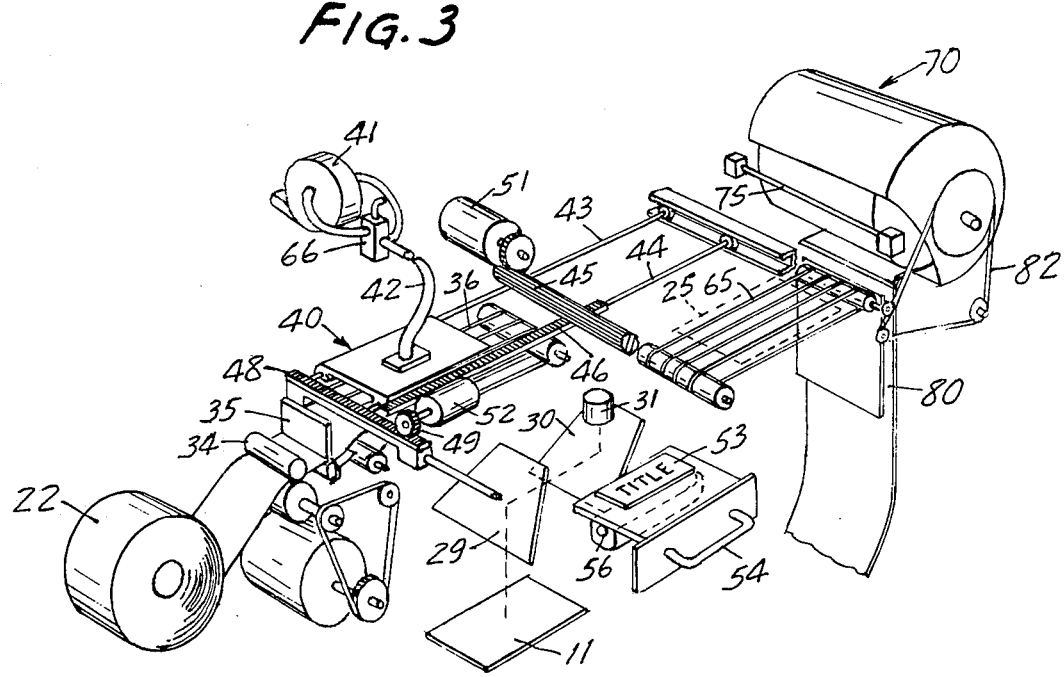
FIG. 3 is an exploded diagramatic illustration of the film handling apparatus which includes the film feeding, film positioning, and film processing device of the camera.
Figure 4:
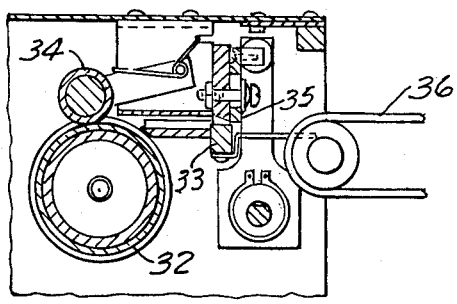
FIG. 4 is a detailed sectional view of the film feeding and cutting mechanism.
Figure 5:
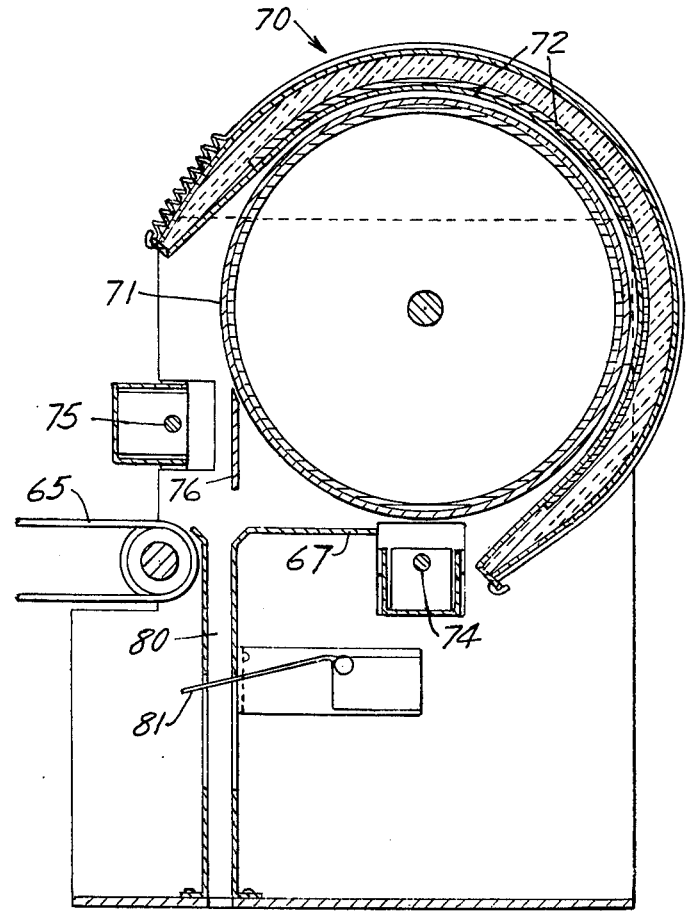
FIG. 5 is an enlarged vertical sectional view of the processing device illustrated in FIG. 3.

In FIG. 3 the operating members of the camera 10 are illustrated diagramatically. The image from the document 11 is reflected from a mirror 29 onto a mirror 30 and focussed by an objective lens and shutter assembly 31 onto the film. The supply roll of film 22 is supported within the camera and is positioned to be withdrawn from the supply roll by a feed roller 32 which cooperates with a pressure roller 34 to feed the film between the blades 33 and 35 of a motor actuated cutoff device upon the withdrawal of a predetermined measured length of film from the roll. This latter sequence is responsive to actuation of a "load film" switch on the control panel 14.

The metered length of the film is placed upon a conveyor 36 comprising a plurality of endless belts positioned about a pair of parallel and spaced rollers. The conveyor 36 positions the film in register beneath a support platen 40. The support platen 40 is supported to be movable relative to the conveyor 36 and the image projecting lens 31. The platen 40 is made of a porous sheet material with a flat black finish to prevent reflections from the surface. The platen 40 is preferably formed of "Tegraglas", a trademark, porous molding material available from Minnesota Mining & Manufacturing Company of St. Paul, Minn. This Tegraglas sheet is sprayed with a very flat black paint to prevent reflection of the light images from its surface back through the light-sensitive coating of the sheet of film. A vacuum is applied to the platen by a suitable blower 41 and flexible hose 42 connected by a fitting to communicate with a manifold above the plate 40.

The platen is movable on two longitudinally positioned spaced support rods 43 and 44. The platen is moved along the support rods 43 and 44 by a rotatable pinion 45 engaging a rack 46 fixed to the platen. The support rods move on fixed tracks or guides extending transversely of the machine frame. A rack 48 fixed to the movable frame, i.e., the rods 43 and 44, is engaged by a pinion 49 to move the frame and platen transversely on the machine frame. The pinions 45 and 49 are driven by a motor 51 and a motor 52 respectively. The motors are controlled by fixed sensing switches and templates supported on the movable frame supporting plate 40. The templates correspond to the X-Y format positioned on the display screen 20 and are correspondingly changeable to adapt the camera to various microfiche formats.

When the cut section of film is placed on the platen the platen moves under the drive of motor 52 transversely of the camera to the title exposure location wherein the title from a prepared negative title mask or negative 53 is positioned. The platen positions the film in closely spaced relationship above the title mask and the negative is exposed to impart a latent image thereof onto the cut sheet of film by a pulse from a fluorescent lamp 56 disposed beneath the support for the title mask. The title mask is changed by sliding a support tray 54 from the camera and removing the existing title negative and replacing it with a different negative.

The platen is supported to step to a position over the lens into the proper location for the first exposure from the document support 12. Control electronics perform this sequence after the title block exposure. The operator starts the sequence for imaging the film by actuating a program switch on the control panel 14. After placing the document to be filmed on the support 12 the operator actuates an exposure switch on the control panel 14. The lens holder of the lens 31 is moved to contact the film during exposure. After delay of approximately 50 milliseconds the shutter is actuated to expose the film. The lens is lowered and the platen automatically steps into the proper location for the next exposure by operation of the motors 51 and/or 52. The lens is again raised to contact the film. The movement of the lens into contact with the film maintains the focus during the exposure without having to maintain extreme accuracy of the platen and platen transport position.

After all of the desired exposures have been made, the operator actuates a process switch on the control panel 14. Platen 40 then moves into a position over a processor conveyor 65 formed of a plurality of endless belts positioned about a pair of parallel spaced rollers. The vacuum is then released from the manifold above the platen 40 and positive air pressure is applied via a valve 66 to the fitting and the manifold. The change in pressure in the manifold to a pressure above atmospheric releases the film from the platen 40 and it is placed onto the processor conveyor 65. The positive and negative pressures in the manifold also serve to effectively clean the face of the porous platen.

The processor 70 comprises a heated rotating drum 71, which is maintained at ground potential, and a heated shoe 72 extending in spaced proximity about a major portion of the drum and spaced a distance exceeding the thickness of the film. The shoe 72 is fixed and extends from a lower section of the drum upward about the drum surface away from the conveyor 65, over the top of the drum to a position on the side of the drum. As the film is moved by the conveyor 65, it moves along a path generally tangential to a surface of the drum at the bottom side of the drum. The film is moved off the conveyor 65 across a guide path 67 and into contact with the drum. As it moves past the guide plate 67 it is charged by a DC corona bar 74 which is positioned along the path of the film. This electrostatic charge placed on the film produces a force sufficient to cause the film to adhere to the surface of the grounded drum. The film is then advanced on the surface of the rotating drum in spaced relationship along the heated surface of the shoe positioned about the drum. The drum and show cause the fragile heat developable coating on the film to be heated for a predetermined time to a predetermined temperature affording development of the latent image. As the processing is completed, the film is removed from the drum. Removal is first effected by the leading edge of the sheet crossing an AC corona bar 75 which removes the static charge from the film, to remove progressively the holding force and allowing it to be readily separated from the surface of the drum 71. A stripping finger or bar 76 is positioned adjacent the surface of the drum 71 to assure that the sheet of film is removed from the drum as it passes the AC corona bar 75.

As the sheet of film is stripped from the surface of drum 71 the sheet is straightened by the stripping bar 76 engaging the film backing and the stripping bar directs the developed film vertically downward into a cooling chute 80 defined by vertically positioned spaced wall members positioning the chute normal to the path of conveyor 65 and also generally tangential to the surface of the drum. The throat of the cooling chute 80 is positioned between the trailing end of the conveyor 65 and the guide plate 67 and extends vertically downward. The film section is cooled as it decends through the chute 80 in a planar orientation and the sensitive coating will cool and solidify to be resistant again to scoring as the film falls through the chute to a discharge tray. The finished microfiche will thus be very flat and easy to position for projection or storing. A sensing bar 81 which is positioned in the chute 80 and is mounted pivotally on a pin to pivot against the bias of a spring will actuate a switch to sense the completion of the processing step.

The drum 71 is driven by a belt or timing chain 82 by a suitable motor and the drive of the drum is synchronized with the conveyor 65 by the chain 82 driving the trailing roller of the spaced rollers.

There are three configurations that can be used for heating the drum and the shoe. In the first configuration a heating element is bonded to the inside of the drum with the heater extending circumferentially and temperature control members for controlling the temperature. The heating element has a higher watt density at the ends of the drum to compensate for the greater heat loss at the ends of the drum and so maintain a uniform temperature axially of the drum. The shoe is heated by radiation and convection and reradiates heat into the emulsion side of the film as the film moves through the space between the drum and the shoe. The heated drum conducts heat into the base side of the film to also heat the coating. In a second configuration the shoe has a heating element that is bonded to the outside surface of the shoe and backed by heavy blanket insulation. The drum is heated by radiation and convection from the heated shoe. In the third configuration both the drum and the shoe are heated directly, applying heat to both surfaces of the film, resulting in a more uniform processing. The temperature of the drum and the shoe is maintained by temperature control elements in each heater which interrupt input power to the heating elements to maintain a constant temperature.

Having described the invention with respect to a preferred embodiment, it is understood that changes may be made without departing from the scope of the appended claims.

I claim:

1. A step and repeat camera for placing images of documents onto microfiche comprising:
   a housing,
   fixed support means for supporting a supply of unexposed light-sensitive heat-developable film,
   means for advancing said film from said supply and placing the same in a reference position,
   support means for contacting said film and placing the same in a fixed horizontal focal plane,
   drive means for moving said support means and said film in mutually perpendicular X and Y directions incrementally to place successive areas of said film in a predetermined location,
   lens and shutter means for imparting images from a support onto said film at said predetermined location, and
   processing means for processing the exposed sheet of film upon exposure of a predetermined number of said areas, said processing device comprises
   a conveyor for receiving an exposed film, said conveyor moving said film along a predetermined path, a drum rotatably mounted about an axis transverse to the direction of movement of said conveyor, said axis supporting the periphery of said drum generally tangential to the path of movement of said conveyor, a shoe disposed about and spaced from the periphery of said drum to allow a film to move therebetween, heating means for heating at least one of said drum and shoe sufficiently to afford the development of a film as said film moves with said drum past said shoe, corona charging means disposed adjacent said drum and said shoe for placing a charge on a section of film moved from said conveyor into contact with said drum and for removing the charge from a film after the same has passed about the surface of said drum to permit said sheet of material to fall edgewise from said surface of said drum, and a vertically positioned chute disposed in a position generally tangential to a side of said drum and positioned below and normal to the path of said conveyor and at the end of said conveyor nearest said drum for receiving and discharging a film separated from said drum.

2. A step and repeat camera according to claim 1 wherein said support means is a plate, said plate being supported below a manifold, means connected to said manifold for reducing the pressure within said manifold beneath atmospheric pressure, said plate being a porous plate having a smooth surface forming an optical support for a film.

3. A step and repeat camera according to claim 2 including means connected to said manifold for producing a pressure greater than atmospheric pressure within said manifold for forcing air through said porous plate to place said film on said conveyor and affording a cleaning action on said plate surface.

* * * * *